Feb. 3, 1948.　　　　C. A. WERNER　　　　2,435,375
BATTERY BRACKET AND HOLDER
Filed Feb. 18, 1946
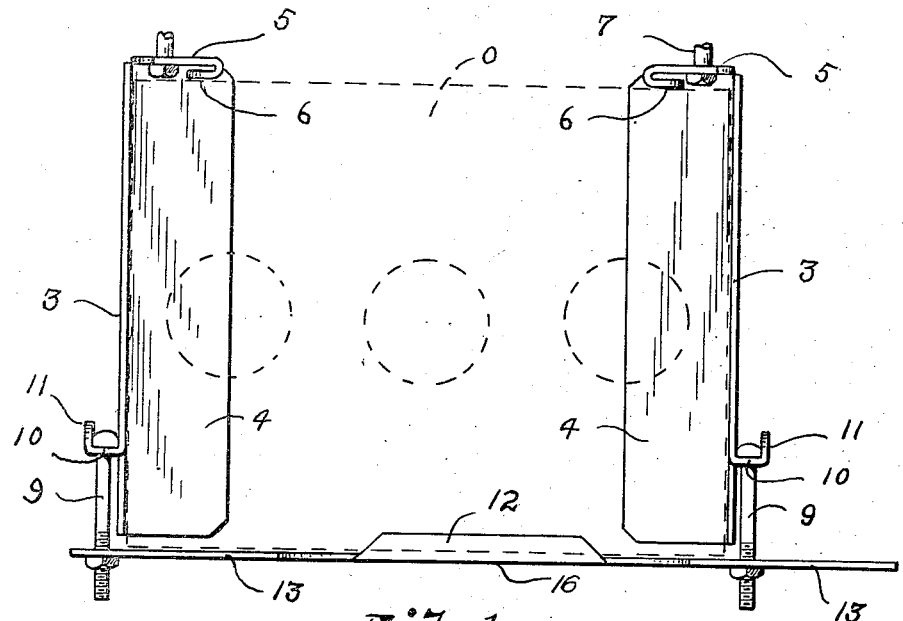
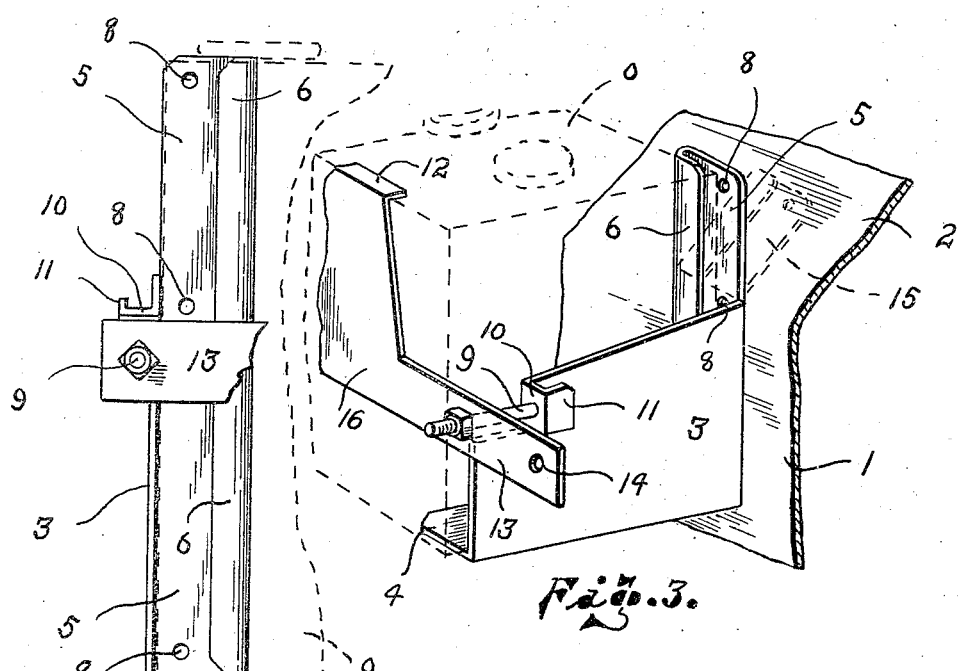
INVENTOR.
Carl A. Werner.
BY Geo Stevens
atty.

Patented Feb. 3, 1948

2,435,375

UNITED STATES PATENT OFFICE 2,435,375

BATTERY BRACKET AND HOLDER

Carl A. Werner, Superior, Wis.

Application February 18, 1946, Serial No. 648,313

5 Claims. (Cl. 180—68.5)

This invention relates to a bracket for installation upon particularly the dash board or adjacent parts of an automobile for supporting the storage battery common to automobiles, one of the principal objects thereof being to provide a bracket of this type having as few simple parts as possible rendering its installation upon the dash board and its functioning with different sized batteries most expeditious.

Another object of the invention is to provide means directly associated with the bracket for simultaneously holding the battery therein against vertical movement.

Other objects and advantages of the invention may appear in the further description thereof.

Reference now being had to the accompanying drawing forming part of this application wherein like reference numerals indicate like parts:

Fig. 1 is a top plan view of the bracket assembled for reception of the smaller type automobile battery, Fig. 2 is a front elevational view of one of the major sections of the bracket, and Fig. 3 is a somewhat reduced perspective view of one of the major sections of the bracket showing its ready adaptation to a dash board having an inclined portion.

In Fig. 3 of the drawing, the reference numeral 1 represents, for example, the dash board of an automobile, it being inclined as at 2 and upon which the bracket assembly is shown as applied. The bracket assembly comprises two major sections, hereinafter referred to as the left and right sections in accordance with the drawing, and a minor part for uniting said major sections.

Each section is shown as stamped out of sheet material the main wall portion 3 of which is bent at right angles inwardly as at 4 forming a support for the battery when received intermediate the two sections.

The vertical rearmost edge of said wall member 3 is bent at right angles in the same direction forming the narrow upwardly extending rearmost wall member 5. This wall member 5 is bent along its entire innermost edge inwardly at right angles and backwardly as at 6 forming an abutment shield for the wall of the battery to prevent the latter from being engaged and damaged by the heads of the holding bolts as indicated at 7, of which there are normally three for each corner section as indicated by the holes 8.

The foremost upper corner of the side wall 3 is bent outwardly preferably approximately the width of the head of the bolt 9 as at 10 thence backwardly parallel as at 11 forming a convenient non-rotatable holding means for said bolt.

The holding bolts 9—9, as is obvious in the drawing, are shown holding the minor battery impinging and clamping member 16, which is deemed novel in that it is provided with the flange or lip 12 for overlapping engagement with the upper front corner of the battery when installed for such coactive engagement with the bracket sections and the lower, opposed holding extensions 13—13 of the clamping member are each provided with spaced holes 14 for selective reception of the clamp in respect to the size of the battery held; and if, peradventure, the battery be the smaller size as shown, at 0, the extra length of extensions 13 may project from either side of the bracket to accommodate any restriction of space necessary.

Thus, when the storage battery is received within the bracket, the operator need merely apply a suitable wrench and draw the bolts 9—9 until the battery is firmly impinged within the bracket.

Fig. 3 shows the right section of the assembly mounted upon a dash board wherein a portion of the latter may be inclined, and the dotted lines show how the upper portion 5 of the wall members may be bent downwardly as at 15 for further fastening to said inclined portion of the dash board.

From the foregoing, it is evident that I have devised a practical and durable bracket free from liability of damaging the battery and made wholly of sheet material with its accompanying advantages.

Having thus described my invention, what I claim is:

1. A bracket for holding a battery on a support comprising two like major parts and a minor part, said major parts each comprising a battery engaging main vertical wall portion, a horizontal supporting portion extending at right angles from the lower end of said main wall portion on which said battery may stand, a support engaging vertical portion extending at right angles to said main wall portion in the same direction as said horizontal portion and having means for securing said major parts to said support, the longitudinal vertical edge of said support engaging portion being bent inwardly forming a battery engaging bead, and said main wall portion having a portion thereof bent outwardly in a direction opposite to said horizontal portion to hold means to adjustably unite said minor part with said major parts, said minor part being removable and adjustable and forming a closure to hold said battery within said bracket.

2. The bracket as set forth in claim 1 further characterized by said minor part having a lip portion extending upwardly and inwardly therefrom for engagement over the adjacent top edge of said battery.

3. The device as set forth in claim 1 further characterized by said support engaging portion extending upwardly beyond said wall portion.

4. A bracket for holding a battery on a support comprising two major parts and a minor part, each of which are formed from a single piece of material, each of said major parts comprising a main wall portion, a battery support portion bent inwardly from said wall portion, a support-engaging portion bent inwardly from one side of said wall portion and having its outer edge bent inwardly forming a battery engaging bead, means on said support-engaging portion for securing said major parts to said support, and said wall portion having a portion thereof bent outwardly therefrom to hold means for adjustably uniting said minor part with said major parts, said minor part being adapted to be removably and adjustably secured to said major parts to form a closure to hold said battery within said support against said beads.

5. The bracket as set forth in claim 4 further characterized by said minor part having a lip portion extending therefrom to overlap a portion of the adjacent top edge of said battery to prevent vertical movement thereof.

CARL A. WERNER.

REFERENCES CITED

The following references are of record in the file of this patent:

UNITED STATES PATENTS

| Number | Name | Date |
| --- | --- | --- |
| 1,607,598 | Andrews | Nov. 23, 1926 |
| 1,840,240 | Ludewig | Jan. 5, 1932 |
| 2,197,623 | Smith et al. | Apr. 16, 1940 |
| 2,257,155 | Bowers | Sept. 30, 1941 |

FOREIGN PATENTS

| Number | Country | Date |
| --- | --- | --- |
| 114,711 | Australia | Feb. 17, 1942 |